United States Patent
Li et al.

(10) Patent No.: US 12,284,422 B2
(45) Date of Patent: Apr. 22, 2025

(54) VIDEO PROCESSING METHOD AND APPARATUS, DEVICE, AND STORAGE MEDIUM

(71) Applicant: BEIJING ZITIAO NETWORK TECHNOLOGY CO., LTD., Beijing (CN)

(72) Inventors: Zhenan Li, Beijing (CN); Wanli Che, Beijing (CN); Bo Zhang, Beijing (CN); Pingfei Fu, Beijing (CN); Yajie Yu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/514,623

(22) Filed: Nov. 20, 2023

(65) Prior Publication Data

US 2024/0089543 A1   Mar. 14, 2024

Related U.S. Application Data

(63) Continuation of application No. PCT/CN2022/093842, filed on May 19, 2022.

(30) Foreign Application Priority Data

Jun. 3, 2021 (CN) .......................... 202110620568.3

(51) Int. Cl.
*H04N 21/472* (2011.01)
*H04N 21/2743* (2011.01)
*H04N 21/4788* (2011.01)

(52) U.S. Cl.
CPC ... *H04N 21/47217* (2013.01); *H04N 21/2743* (2013.01); *H04N 21/4788* (2013.01)

(58) Field of Classification Search
CPC ......... H04N 21/47217; H04N 21/2743; H04N 21/4788; H04N 21/854; H04N 7/147;
(Continued)

(56) References Cited

U.S. PATENT DOCUMENTS

| 6,754,548 B1 | 6/2004 | Yoshii et al. |
| 2002/0065074 A1* | 5/2002 | Cohn .................... H04M 3/487 455/403 |

(Continued)

FOREIGN PATENT DOCUMENTS

| CN | 1305173 A | 7/2001 |
| CN | 103440439 A | 12/2013 |

(Continued)

OTHER PUBLICATIONS

Segall, Laurie, Snapchat's 'disappearing' videos don't actually vanish, Dec. 28, 2012, cnn.com, pp. 1-3, Snapchat's ' disappearing' videos don't actually vanish (cnn.com) (Year: 2012).*

(Continued)

*Primary Examiner* — Cynthia M Fogg
(74) *Attorney, Agent, or Firm* — Fish & Richardson P.C.

(57) ABSTRACT

The present disclosure provides a video processing method and apparatus, a device, and a storage medium. The method comprises: in response to that a target video is being played back, displaying a playback progress bar in a preset countdown mode, wherein the playback progress bar does not support adjustment of a playback progress function; and in response to detecting that playback of a last frame of the target video has ended, then stopping the playback of the target video, displaying a mask layer on a video picture of the last frame of the target video, and displaying preset prompt information on the mask layer, wherein the preset prompt information is used for prompting that the target video only supports playback once.

20 Claims, 13 Drawing Sheets

(58) Field of Classification Search
CPC ............. H04N 23/631; H04N 21/8355; H04N 21/6587; H04N 21/44204
USPC ........................................................ 725/116
See application file for complete search history.

(56) References Cited

U.S. PATENT DOCUMENTS

| | | | |
|---|---|---|---|
| 2006/0013554 A1* | 1/2006 | Poslinski | H04N 21/4828 386/250 |
| 2006/0069649 A1* | 3/2006 | Morten | G06F 21/50 348/E7.056 |
| 2006/0110136 A1 | 5/2006 | Abecassis | |
| 2007/0143809 A1* | 6/2007 | Chen | H04N 21/47214 348/E7.071 |
| 2013/0064524 A1 | 3/2013 | Griffin et al. | |
| 2013/0254001 A1* | 9/2013 | Acar | G06Q 30/06 705/14.23 |
| 2013/0263002 A1* | 10/2013 | Park | G06F 3/0484 715/719 |
| 2014/0223307 A1* | 8/2014 | McIntosh | H04N 21/47217 715/719 |
| 2015/0156549 A1 | 6/2015 | Chong et al. | |
| 2016/0104213 A1* | 4/2016 | Graziano | G06Q 30/0249 705/14.69 |
| 2016/0255151 A1 | 9/2016 | Fu et al. | |
| 2016/0328134 A1 | 11/2016 | Xu | |
| 2018/0007155 A1* | 1/2018 | Saito | H04N 21/44204 |
| 2019/0267037 A1 | 8/2019 | Jiang et al. | |
| 2023/0013160 A1* | 1/2023 | Lennon | H04N 21/44016 |

FOREIGN PATENT DOCUMENTS

| | | |
|---|---|---|
| CN | 104685898 A | 6/2015 |
| CN | 104853231 A | 8/2015 |
| CN | 107690081 A | 2/2018 |
| CN | 109462770 A | 3/2019 |
| CN | 113365154 A | 9/2021 |
| JP | 2009064314 A | 3/2009 |
| JP | 2010258511 A | 11/2010 |
| JP | 2014155070 A | 8/2014 |
| JP | 2017011593 A | 1/2017 |
| WO | 2019205882 A1 | 10/2019 |

OTHER PUBLICATIONS

Kriel, Collen, How to use Instagram's new live video and disappearing messages features, Nov. 22, 2016, siliconangle.com, pp. 1-4, https://siliconangle.com/2016/11/22/how-to-use-instagrams-new-live-video-and-disappearingmessages-features/ (Year: 2016).*

Costa, Andre Da, How to Use Instagram Direct to Send Disappearing Photos and Videos, Dec. 6, 2017, Groovypost.com, pp. 1-7, How to Use Instagram Direct to Send Disappearing Photos and Videos (groovypost.com). (Year: 2017).*

Amir, Android Tech Channel, "How to Reply on Snapchat", Sep. 9, 2019, YouTube, https://www.youtube.com/watch?v=VsKp1v7uTTE (Year: 2019).*

Singh, Satyendra Pal, How to Send Disappearing Messages on WhatsApp, Nov. 19, 2020, Gadgets to Use, pp. 1-4, How to Send Disappearing Messages on WhatsApp—Gadgets to Use (Year: 2020).*

International Search Report (with English translation) and Written Opinion issued in PCT/CN2022/093842, dated Aug. 26, 2022, 11 pages provided.

Fanfen F, "How to automatically destroy the shared vedio after watching in wechat", https://jingyan.baidu.com/article/6c67b1d6b22d882787bb1efc.html, Aug. 8, 2017, with English translation.

Extended European Search Report in European Appln No. 22815045.4, dated Sep. 19, 2024, 8 pages.

Venolia et al., "SeeSaw: I See You Saw My Video Message," MobileHCI '15: Proceedings of the 17th International Conference on Human-Computer Interaction with Mobile Devices and Services, Copenhagen, Denmark, August 24-27, 244-253, 10 pages.

Communication pursuant to Rules 70(2) and 70a(2) EPC for European Application No. 22815045.4, mailed Oct. 9, 2024, 1 page.

Notice of Reasons for Refusal for Japanese Application No. 2023-574121, mailed Dec. 17, 2024, 6 pages.

* cited by examiner

VIDEO PROCESSING METHOD AND APPARATUS, DEVICE, AND STORAGE MEDIUM

This application is a continuation of International Application No. PCT/CN2022/093842, as filed on May 19, 2022, which claims priority to Chinese patent application No. 202110620568.3 filed with the Chinese Patent Office on Jun. 3, 2021 and entitled "VIDEO PROCESSING METHOD AND APPARATUS, DEVICE, AND STORAGE MEDIUM". The disclosure of each of these applications is hereby incorporated by reference into the present application in its entirety.

TECHNICAL FIELD

The present disclosure relates to the field of data processing, and in particular, to a video processing method and apparatus, a device, and a storage medium.

BACKGROUND

With the continuous development of multimedia short video technology, a video-based entertainment mode is more and more popular.

SUMMARY

An embodiment of the present disclosure provides a video processing method, which proposes a video interaction mode that only supports playback once, thereby enriching the video-based entertainment mode of a user, and improving the user experience.

In a first aspect, the present disclosure provides a video processing method, comprising:
  in response to that a target video is being played back, displaying a playback progress bar in a preset countdown mode, wherein the playback progress bar does not support adjustment of a playback progress function; and
  in response to detecting that playback of a last frame of the target video has ended, then stopping the playback of the target video, displaying a mask layer on a video picture of the last frame of the target video, and displaying preset prompt information on the mask layer, wherein the preset prompt information is used for prompting that the target video only supports playback once.

In an alternative implementation, the method further comprises:
  in response to a preset triggering operation for the target video, displaying a shooting prompt window corresponding to the target video, wherein the shooting prompt window is thereon provided with a preset shooting entry; and
  in response to a triggering operation for the preset shooting entry, displaying a shooting page with a shooting mode corresponding to the target video.

In an alternative implementation, a playback page for the target video is thereon provided with a preset point; and
  the displaying, in response to a preset triggering operation for the target video, a shooting prompt window corresponding to the target video comprises:
  in response to a triggering operation on the preset point on the playback page for the target video or a non-button area on the mask layer, displaying the shooting prompt window corresponding to the target video.

In an alternative implementation, the shooting page is thereon provided with a shooting mode control corresponding to the target video; and after the displaying, in response to a triggering operation for the preset shooting entry, a shooting page with a shooting mode corresponding to the target video, the method further comprises:
  in response to a triggering operation on the shooting mode control on the shooting page, switching an enabled/disabled state of the shooting mode control, and displaying prompt information corresponding to the switched enabled/disabled state.

In an alternative implementation, the method further comprises:
  in response to a triggering operation of switching the enabled/disabled state of the shooting mode control to an enabled state, switching a display icon of a shooting button on the shooting page to an icon corresponding to the shooting mode control.

In an alternative implementation, the method further comprises:
  in response to a shooting end operation triggered on the shooting page, presenting a shooting result video on a video editing page, wherein the video editing page is thereon provided with an editing control corresponding to the shooting mode control; and
  in response to a triggering operation of switching an enabled/disabled state of the editing control to an enabled state, processing the shooting result video into a video type to which the target video belongs.

In an alternative implementation, the preset countdown mode comprises a flame burning countdown mode.

In an alternative implementation, the method further comprises:
  in response to that detecting that the playback of the last frame of the target video has ended, then displaying a preset shooting-with-same-style entry on the playback page for the target video; and
  in response to a triggering operation for the preset shooting-with-same-style entry, displaying a shooting page based on a music resource and/or prop resource carried by the target video, wherein the shooting page has the shooting mode corresponding to the target video.

In an alternative implementation, the method further comprises:
  in response to detecting that the playback of the last frame of the target video has ended, then displaying a preset quick comment box on the playback page for the target video, wherein the preset quick comment box is used for inputting comment information for the target video.

In an alternative implementation, the method further comprises:
  in response to a sharing operation for the target video, generating a mask layer for a cover of the target video, and presenting the cover of the target video with the mask layer on a sharing page.

In an alternative implementation, the method further comprises:
  in response to detecting that the target video is displayed on a user personal homepage, generating a mask layer for a cover of the target video.

In an alternative implementation, the displaying, in response to that a target video is being played back, a playback progress bar in a preset countdown mode comprises:
  in response to a triggering operation of switching a first type video to the target video, playing back the target video, and switching a first type playback progress bar corresponding to the first type video to the playback progress bar in the preset countdown mode, wherein the first type playback progress bar supports the adjustment of the playback progress function, and the first type video supports playback many times.

In a second aspect, the present disclosure provides a video processing apparatus, comprising:
a first display module configured to, in response to that a target video is being played back, display a playback progress bar in a preset countdown mode, wherein the playback progress bar does not support pausing of a playback function;
a second display module configured to, in response to detecting that playback of a last frame of the target video has ended, stop the playback of the target video, and display a mask layer on a video picture of the last frame of the target video; and
a third display module configured to display preset prompt information on the mask layer, wherein the preset prompt information is used for prompting that the target video only supports playback once.

In a third aspect, the present disclosure provides a computer-readable storage medium having therein stored instructions which, when run on a terminal device, cause the terminal device to implement the above method.

In a fourth aspect, the present disclosure provides a device, comprising: a memory, a processor, and a computer program stored on the memory and running on the processor, the processor implementing the above method when executing the computer program.

In a fifth aspect, the present disclosure provides a computer program product comprising computer programs/instructions which, when executed by a processor, implement the above method.

BRIEF DESCRIPTION OF THE DRAWINGS

The accompanying drawings herein, which are incorporated in and constitute a part of this specification, illustrate embodiments consistent with the present disclosure and, together with the description, serve to explain the principles of the present disclosure.

In order to more clearly illustrate the embodiments of the present disclosure or technical solutions in the related art, the drawings that need to be used in the description of the embodiments or related art will be briefly described below, and it is obvious that, for one of ordinary skill in the art, other drawings can be obtained according to these drawings without paying creative efforts.

DETAILED DESCRIPTION

In order that the above objectives, features and advantages of the present disclosure can be more clearly understood, solutions of the present disclosure will be further described below. It should be noted that, in the case of no conflict, the embodiments of the present disclosure and features in the embodiments may be combined with each other.

In the following description, numerous specific details are set forth in order to provide thorough understanding of the present disclosure, but the present disclosure may also be implemented in other ways different from those described herein; and it is obvious that the embodiments in the description are only some embodiments of the present disclosure, rather than all embodiments.

With the continuous development of multimedia short video technology, a video-based entertainment mode is more and more popular. In order to meet entertainment requirements of people, how to continuously enrich video interaction-based modes is a technical problem to be solved urgently at present.

In order to enrich the video interaction-based modes to improve users' experiences of video-based entertainments, an embodiment of the present disclosure provides a video type only supporting playback once, also called a "flicker" type, wherein in response to that a target video belonging to the video type is being played back, a playback progress bar in a preset countdown mode that does not support adjustment of a playback progress function is displayed, and in response to detecting that playback of a last frame of the target video has ended, the playback of the target video is stopped, and on the basis of the last frame of the target video, preset prompt information is displayed to prompt the user that the target video only supports playback once.

Figure 1:
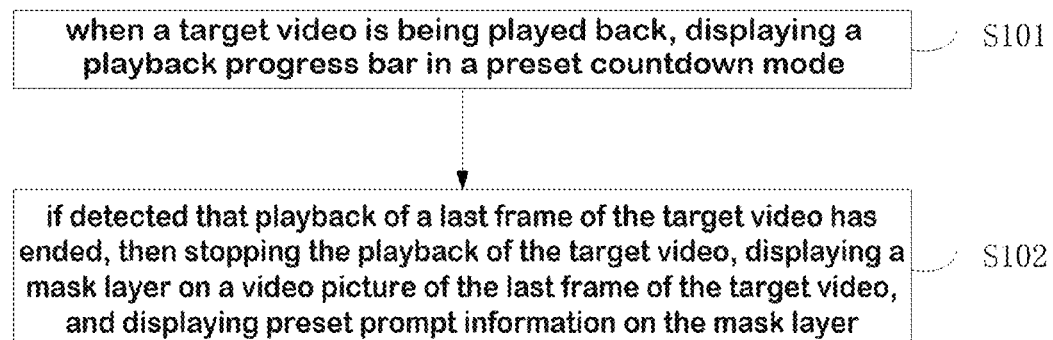
FIG. 1 is a flow diagram of a video processing method provided by an embodiment of the present disclosure.
Figure 2:
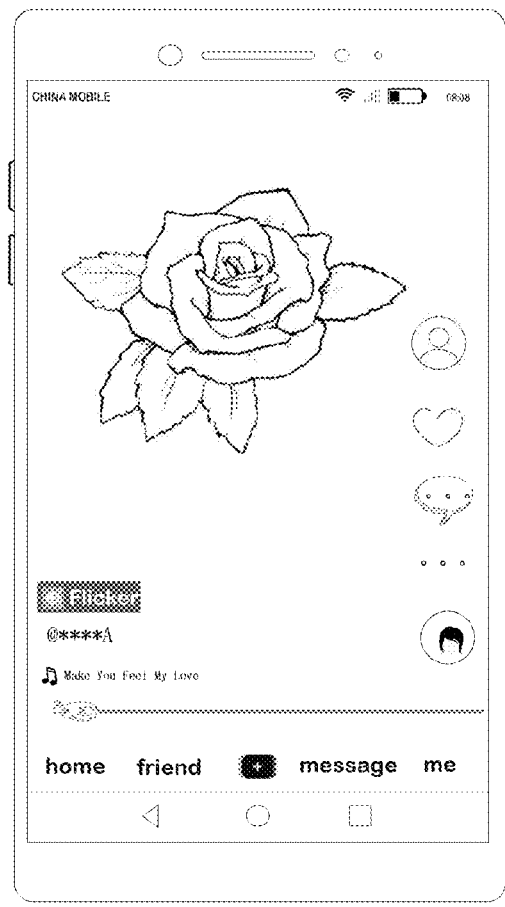
FIG. 2 is a schematic diagram of a playback page for a target video provided by an embodiment of the present disclosure.

Based on this, according to some embodiments of the present disclosure, there is provided a video processing method as shown in FIG. 1, which is a flow diagram of a video processing method provided by an embodiment of the present disclosure, the method comprising:

S101: in response to that a target video is being played back, display a playback progress bar in a preset countdown mode, wherein the playback progress bar does not support adjustment of a playback progress function.

In the embodiment of the present disclosure, the target video may be from a video recommendation stream, or from a friend video stream of a user, and the like, which is not limited in the embodiment of the present disclosure.

In a practical application, in response to that the target video is being played back, the playback progress bar in the preset countdown mode may be presented on a video playback page to display playback progress of the target video. The playback progress bar in the preset countdown mode does not support the adjustment of the playback progress function, and specifically, the adjustment of the playback progress function may include functions such as forward playback progress, backward playback progress, pause playback, stop playback, playback from the beginning, and the like. That is to say, the playback progress bar in the embodiment of the present disclosure does not support the above functions of adjusting the playback progress.

In an alternative implementation, the preset countdown mode may be a flame burning countdown mode, for providing, to the user, an immersive effect that the target video is destroyed after the playback has ended, thereby improving the user experience.

In addition, the playback page for the target video may also be thereon provided with a preset point capable of identifying a video type to which the target video belongs, for example, a "flicker" point for identifying that the target video belongs to a video type that only supports playback once. Specifically, the preset point on the video playback page can not only identify the video type to which the target video belongs, but also serve as an entry to a shooting page, wherein a specific interaction mode is introduced subsequently.

In an application scenario, in response to that a triggering operation of switching a first type video to the target video has been received, the playback progress bar on the video playback page is switched from a first type playback progress bar corresponding to the first type video to the playback progress bar in the preset countdown mode while the target video is played back. Specifically, the first type playback progress bar supports the adjustment of the playback progress function, and the first type video supports playback many times.

Hence, in the above application scenario, in response to that the user is browsing from the first type video to the target video, the playback progress bar of the video playback page is, at the same time, switched from supporting the adjustment of the playback progress function to not supporting the adjustment of the playback progress function. Through the adjustment of the playback progress bar function, the difference between the target video that only supports playback once and the traditional first type video is obviously represented, thereby enriching the video interaction mode for the user, and improving the user experience.

S102: in response to detecting that playback of a last frame of the target video has ended, then stopping the playback of the target video, displaying a mask layer on a video picture of the last frame of the target video, and displaying preset prompt information on the mask layer.

The preset prompt information is used for prompting that the target video only supports playback once.

In the embodiment of the present disclosure, in response to that the target video is being played back, it is detected whether the playback of the last frame of the target video has ended, and in response to detecting that the playback of the last frame of the target video has ended, it is indicated that the complete playback once of the target video has ended, and at this time, continuous playback of the target video is stopped, to implement the video interaction mode that only supports playback once.

In order to prompt the user that the target video being currently played back only supports playback once, in the embodiment of the present disclosure, in response to detecting that the playback of the last frame of the target video has ended, the mask layer may be displayed on the video picture of the last frame of the target video, and the preset prompt information may be displayed on the mask layer to prompt the user that the target video only supports playback once and playback again cannot be triggered.

Figure 3:
FIG. 3 is a schematic diagram of another playback page for target video provided by an embodiment of the present disclosure.

Reference is made to FIG. 3, which is a schematic diagram of another playback page for a target video provided by an embodiment of the present disclosure, wherein in response to that playback of a last frame of the target video has ended, one mask layer is, on the playback page for the target video, covered for a video picture of the last frame of the target video, and prompt information of "this work can be viewed only once and has been destroyed" is displayed on the mask layer, to prompt the user that the target video only supports playback once.

In the video processing method provided by the embodiments of the present disclosure, in response to that a target video is being played back, a playback progress bar in a preset countdown mode that does not support adjustment of a playback progress function is displayed, in response to detecting that playback of a last frame of the target video has ended, the playback of the target video is stopped, and on the basis of the last frame of the target video, preset prompt information used for prompting that the target video only supports playback once is displayed. Hence, the embodiments of the present disclosure provide a video interaction mode that only supports playback once, thereby enriching the video-based entertainment mode of the user, and improving the user experience.

Figure 4:
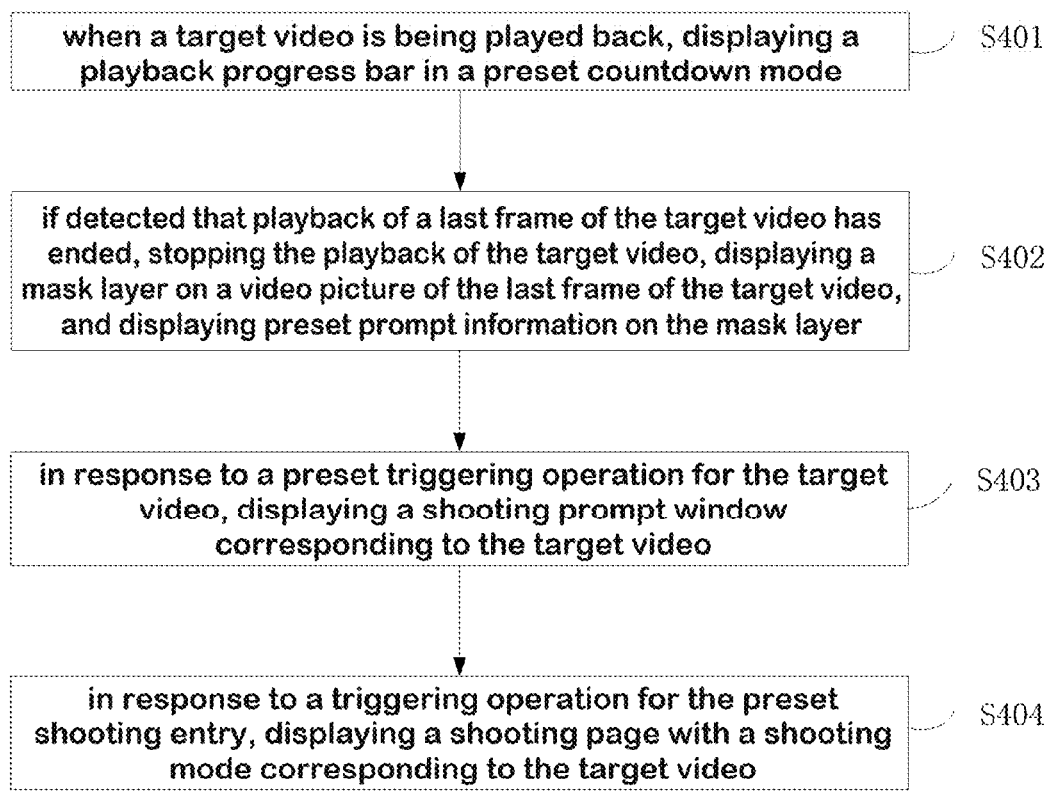
FIG. 4 is a flow diagram of another video processing method provided by an embodiment of the present disclosure.

In order to further enrich the video interaction mode, on the basis of the above embodiments, the embodiments of the present disclosure further provide a video processing method as shown in FIG. 4, which is a flow diagram of another video processing method provided by an embodiment of the present disclosure, the method comprising:

S401: in response to that a target video is being played back, displaying a playback progress bar in a preset countdown mode;

wherein, the playback progress bar does not support adjustment of a playback progress function;

S402: in response to detecting that playback of a last frame of the target video has ended, stopping the playback of the target video, displaying a mask layer on a video picture of the last frame of the target video, and displaying preset prompt information on the mask layer;

wherein the preset prompt information is used for prompting that the target video only supports playback once.

The S401 and S402 in the embodiments of the present disclosure may be understood with reference to the above embodiments, and are not repeated herein.

S403: in response to a preset triggering operation for the target video, displaying a shooting prompt window corresponding to the target video;

wherein the shooting prompt window is thereon provided with a preset shooting entry.

In the embodiment of the present disclosure, on a playback page for the target video, in response to that a preset triggering operation for the target video has been received, then a shooting prompt window corresponding to the target video is displayed. The preset triggering operation may be a triggering operation for a preset point provided on the playback page for the target video, or a triggering operation for a non-button area on the mask layer displayed on the video picture of the last frame of the target video, or the like.

In an alternative implementation, in response to that the triggering operation for the preset point on the playback page for the target video has been received, the shooting prompt window corresponding to the target video is displayed. The triggering operation for the preset point may occur in response to that the target video is being played back, or after the playback of the last frame of the target video has ended.

In another alternative implementation, after the mask layer is displayed on the video picture of the last frame of the target video, in response to that the triggering operation for the non-button area on the mask layer has been received, then the shooting prompt window corresponding to the target video is displayed. The non-button area refers to any area other than a clickable button area.

It should be noted that the preset triggering operation for invoking the shooting prompt window may be other operations preset based on requirements, which is not limited herein.

Figure 5:
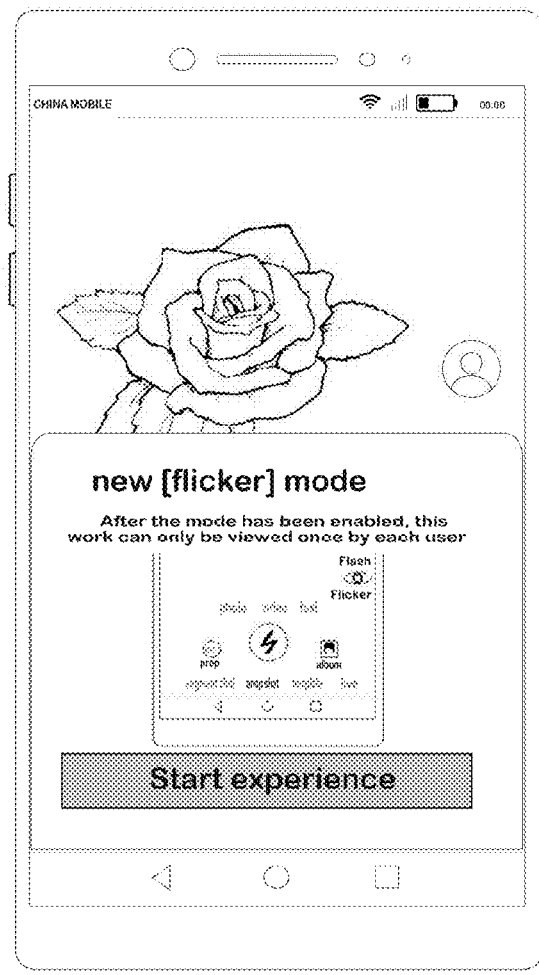
FIG. 5 is a schematic diagram of a shooting prompt window provided by an embodiment of the present disclosure.

In addition, the shooting prompt window is used for prompting the user that shooting may be performed for a video type to which the target video belongs, and the shooting prompt window may be a half-screen prompt window, as shown in FIG. 5, which is a schematic diagram of a shooting prompt window provided by an embodiment of the present disclosure. The shooting prompt window is a half-screen prompt window located at a lower part of a screen, the shooting prompt window being thereon provided with a preset shooting entry, for example, a "start experience" entry in FIG. 5.

In addition, on the shooting prompt window in FIG. 5, prompt information which is, for example, "new [flicker] mode: after the mode has been enabled, this work can only be viewed once by each user" is also displayed to prompt the user that shooting of a video for only playback once may be experienced. In addition, animation for a shooting page may also be played on the shooting prompt window, so that the user can know in advance a style of the shooting page that can be displayed by clicking the "start experience" entry.

S404: in response to a triggering operation for the preset shooting entry, displaying a shooting page with a shooting mode corresponding to the target video.

In the embodiment of the present disclosure, in response to that the triggering operation for the preset shooting entry on the shooting prompt window has been received, it jumps to the shooting page. The shooting page has the shooting mode corresponding to the target video, namely the mode of shooting a video for only playback once.

Figure 6:
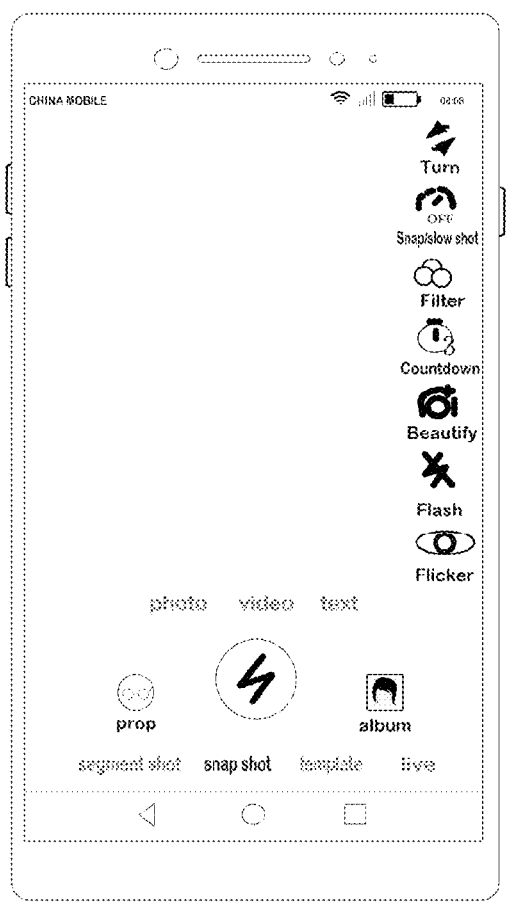
FIG. 6 is a schematic diagram of a shooting page provided by an embodiment of the present disclosure.

Reference is made to FIG. 6, which is a schematic diagram of a shooting page provided by an embodiment of the present disclosure, wherein the shooting page is thereon provided with a shooting mode control corresponding to the target video, for example, a "flicker" control on a right side of FIG. 6. Through a triggering operation such as clicking, an enabled/disabled state of the shooting mode control can be switched, wherein in response to that the enabled/disabled state of the shooting mode control is switched to an enabled state, the video for only playback once can be shot.

Figure 7:
FIG. 7 is a schematic diagram of another shooting page provided by an embodiment of the present disclosure.

In an alternative implementation, in order to make the user know the current enabled/disabled state of the shooting mode control more clearly, prompt information of the current enabled/disabled state may be displayed on the shooting page. Specifically, in response to that a triggering operation for the shooting mode control on the shooting page has been received, the enabled/disabled state of the shooting mode control may be switched, and prompt information corresponding to the switched enabled/disabled state is displayed. As shown in FIG. 7, which is a schematic diagram of another shooting page provided by an embodiment of the present disclosure, on a left side of the shooting page, prompt information which is, for example, "flicker has been enabled, and this work can only be viewed once by each user", may be displayed to prompt the user that the shooting mode of flicker has been currently enabled. In addition, a mask layer with transparency increasing gradually from left to right can be displayed on the shooting page, the prompt information is displayed on the mask layer, and at the same time it is guaranteed that the display of the shooting mode control located on a right side of the shooting page is not affected.

In addition, in response to that the enabled/disabled state of the shooting mode control is switched to the enabled state, a display icon of a shooting button on the shooting page may be switched to an icon corresponding to the shooting mode control, for example, the display icon of the shooting button may be switched from an icon in FIG. 6 to an icon in FIG. 7, to prompt the user that the video of the flicker type may be shot currently.

Figure 8:
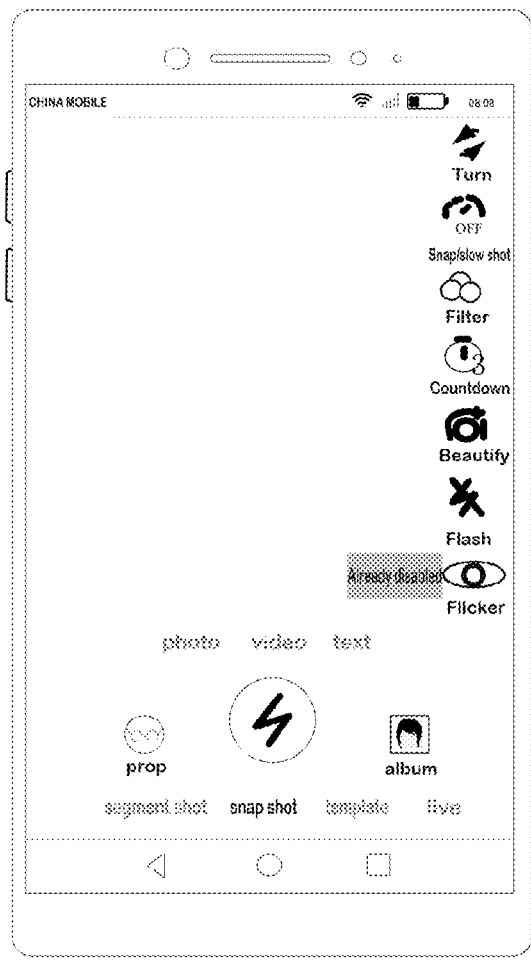
FIG. 8 is a schematic diagram of still another shooting page provided by an embodiment of the present disclosure.

In an alternative implementation, in response to that the enabled/disabled state of the shooting mode control on the shooting page is switched to an disabled state, prompt information of the disabled state may be displayed on the shooting page, as shown in FIG. 8, which is a schematic diagram of another shooting page provided by an embodiment of the present disclosure, wherein prompt information of "already disabled" is displayed on a mask layer on a left side of a shooting mode control to prompt the user that a current state of the shooting mode control is an already-disabled state, and a "flicker" shooting mode is not currently enabled.

In the video processing method provided by the embodiment of the present disclosure, on the basis of the video interaction mode of only playback once, an immersive interaction space is also provided for the user, where the user is guided to enter the shooting page to shoot a video for only playback once, thereby further improving the user experience.

In addition, on the basis of the above embodiments, in response to detecting that the user triggers a shooting end operation on the shooting page, the shooting page jumps to a video editing page, and a shooting result video is presented on the video editing page, and subsequently, editing for the shooting result video can be performed on the video editing page.

Figure 9:
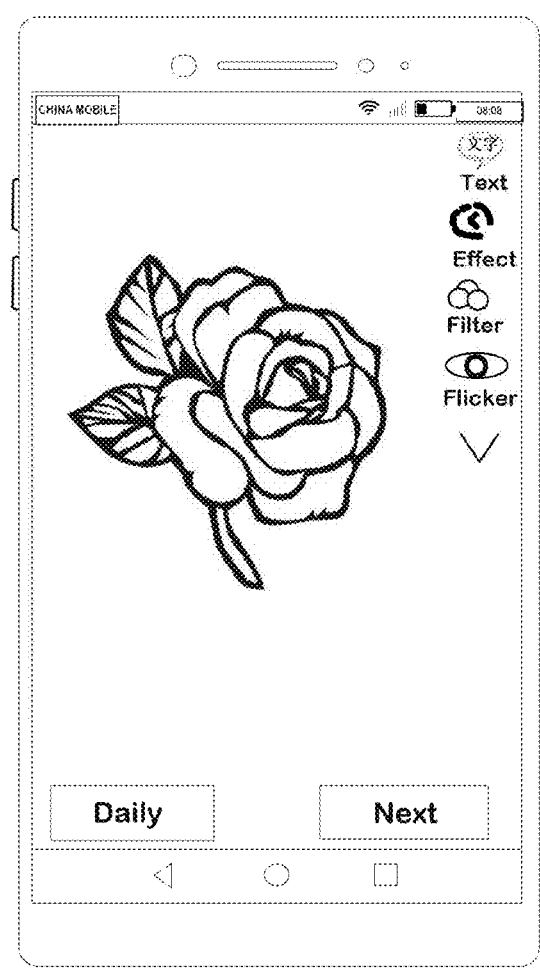
FIG. 9 is a schematic diagram of a video editing page provided by an embodiment of the present disclosure.

The video editing page provided by the embodiment of the present disclosure is thereon provided with an editing control corresponding to the shooting mode control on the shooting page, as shown in FIG. 9, which is a schematic diagram of a video editing page provided by an embodiment of the present disclosure, wherein the video editing page is thereon provided with a "flicker" editing control, for editing the shooting result video displayed on the video editing page into a video of a "flicker" type. In addition, in order to prompt the user about a current enabled/disabled state of the editing control, prompt information about the current enabled/disabled state of the editing control can be displayed on the video editing page. In response to that the current enabled/disabled state of the editing control is an enabled state, prompt information which is, for example, "the video can only be viewed once by everyone" may be displayed on the video editing page; and in response to that the current enabled/disabled state of the editing control is an disabled state, prompt information which is, for example, "already disabled", may be displayed on the video editing page.

It is worth noting that the shooting result video in the embodiment of the present disclosure may be shot in the enabled state of the shooting mode control on the shooting page, or in the disabled state of the shooting mode control. That is to say, the shooting result video displayed on the video editing page may be the video of the "flicker" type, or may be a video of another type, such as a video shot in a "snapshot for 15 seconds" mode.

In the embodiment of the present disclosure, after the shooting result video is presented on the video editing page, in response to that a triggering operation of switching the enabled/disabled state of the editing control on the video editing page to the enabled state is received, the shooting result video is processed into the video type to which the target video belongs, i.e., the "flicker" type.

In a practical application, before the shooting result video is released, the shooting result video may be edited based on controls on a right side of the video editing page shown in FIG. 9. In releasing the edited shooting result video, in response to that the editing control on the video editing page is in the enabled state, the edited shooting result video released belongs to the video of the "flicker" type.

In the video processing method provided by the embodiment of the present disclosure, on the basis of a video interaction mode of only playback once, an immersive interaction space is also provided for the user, where not only the user can be guided to enter the shooting page to shoot the video for only playback once, but also the video editing page with the "flicker" type editing function can be provided for the user, thereby further improving the user experience.

In order to further enrich the video interaction-based modes, on the playback page for the target video in the embodiments of the present disclosure, once detected that the playback of the last frame of the target video has ended, a preset shooting-with-same-style entry can be displayed on the playback page for the target video. By executing a triggering operation for the preset shooting-with-same-style entry, a function of shooting a same style video having same music and/or props as the target video is realized.

Figure 10:
FIG. 10 is a schematic diagram of another playback page for a target video provided by an embodiment of the present disclosure.

Reference is made to FIG. 10, which is a schematic diagram of another playback page for a target video provided by an embodiment of the present disclosure, wherein in response to that playback of a last frame of the target video has ended, not only may a mask layer be displayed on a video picture of the last frame, but also a preset shooting-with-same-style entry may be displayed at a preset position of the playback page (for example, a position of a lower part of the playback page in FIG. 10). By clicking the preset shooting-with-same-style entry, the playback page jumps to a shooting page, wherein the shooting page is thereon provided with the shooting mode (also called the "flicker" mode) corresponding to the target video.

In a practical application, in response to that the triggering operation for the preset shooting-with-same-style entry has been received, firstly, a music resource and/or a prop resource carried by a target video is acquired, and then, based on the acquired music resource and/or prop resource, the playback page jumps to the shooting page to realize the function of shooting a same style video. Specifically, the preset shooting-with-same-style entry may be used for triggering shooting of a video having the same-style music resource and/or prop resource as the target video, and a type of the video may be the video type only supporting playback once that is the same as that of the target video.

In an alternative implementation, in response to that the triggering operation for the preset shooting-with-same-style entry has been received, the music resource and prop resource carried by the target video can be acquired, and then the shooting page is entered based on the acquired music resource and prop resource, to shoot the video having the same-style music and prop as the target video.

In another alternative implementation, in response to that the triggering operation for the preset shooting-with-same-style entry has been received, the prop resource carried by the target video may be acquired, and then the shooting page is entered based on the prop resource to shoot a video having the same-style prop as the target video.

In yet another alternative implementation, in response to that the triggering operation for the preset shooting-with-same-style entry has been received, the music resource carried by the target video may be acquired, and then the shooting page is entered based on the music resource to shoot a video having the same-style music as the target video.

In addition, in order to further enrich the video interaction-based modes, on the playback page for the target video in the embodiments of the present disclosure, once detected that the playback of the last frame of the target video has ended, a preset quick comment box may be displayed on the playback page for the target video. By inputting comment information for the target video in the preset quick comment box, a function of quick comment on the target video is realized.

Figure 11:
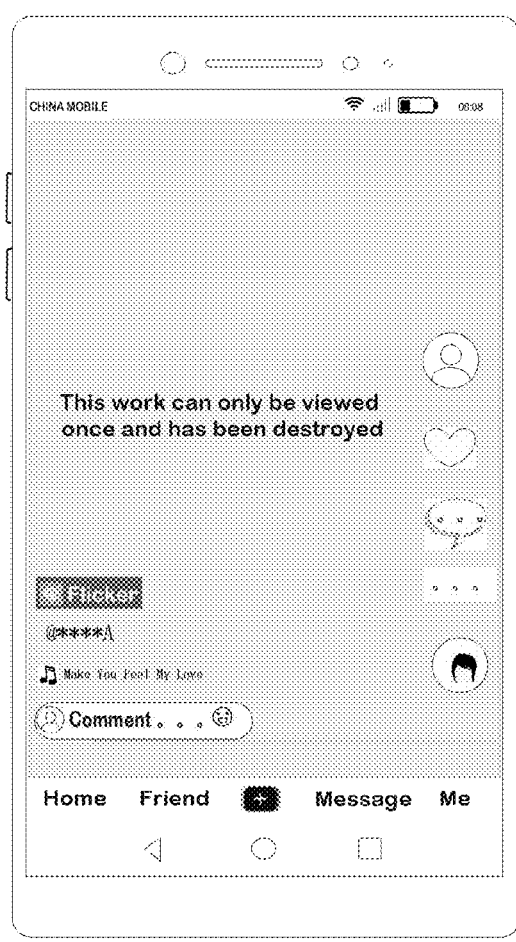
FIG. 11 is a schematic diagram of still another playback page for a target video provided by an embodiment of the present disclosure.

As shown in FIG. 11, it is a schematic diagram of another playback page for a target video provided by an embodiment of the present disclosure, wherein in response to that playback of a last frame of the target video has ended, not only may a mask layer be displayed on a video picture of the last frame, but also a preset quick comment box may be displayed at a preset position of the playback page (for example, a position of a lower part of the playback page in FIG. 11). By clicking the preset quick comment box, a function of quick comment on the target video is realized.

In the video processing method provided by the embodiments of the present disclosure, not only can the preset shooting-with-same-style entry be provided on the playback page for the target video, but also the preset quick comment box can be provided, to realize the function of shooting with the same style and the function of quick comment, hence, the embodiments of the present disclosure can further enrich the video interaction modes and improve the user experience.

In order to identify the video of the "flicker" type and at the same time reflect the effect of only supporting playback once, in the embodiments of the present disclosure, a mask layer such as a Gaussian blur mask layer, may be generated for a cover of the target video in a scenario such as cover presentation and resource sharing for the target video.

Figure 12:
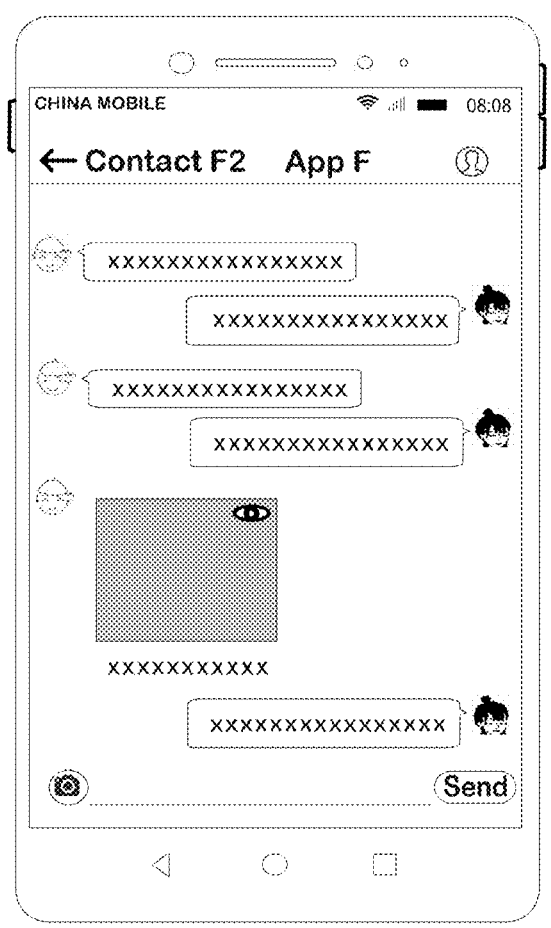
FIG. 12 is a schematic diagram of a sharing page provided by an embodiment of the present disclosure.

As shown in FIG. 12, it is a schematic diagram of a sharing page provided by an embodiment of the present disclosure, wherein a mask layer is generated on a cover of a target video, and at the same time, an eye icon as shown in FIG. 12 may be displayed, for identifying that the target video belongs to the video that only supports playback once, to prompt the user.

In a practical application, in response to that a sharing operation for the target video has been received, the cover of the target video is presented on the sharing page, and at the same time, the mask layer is generated for the cover to identify that the currently shared video belongs to the video that only supports playback once.

Figure 13:
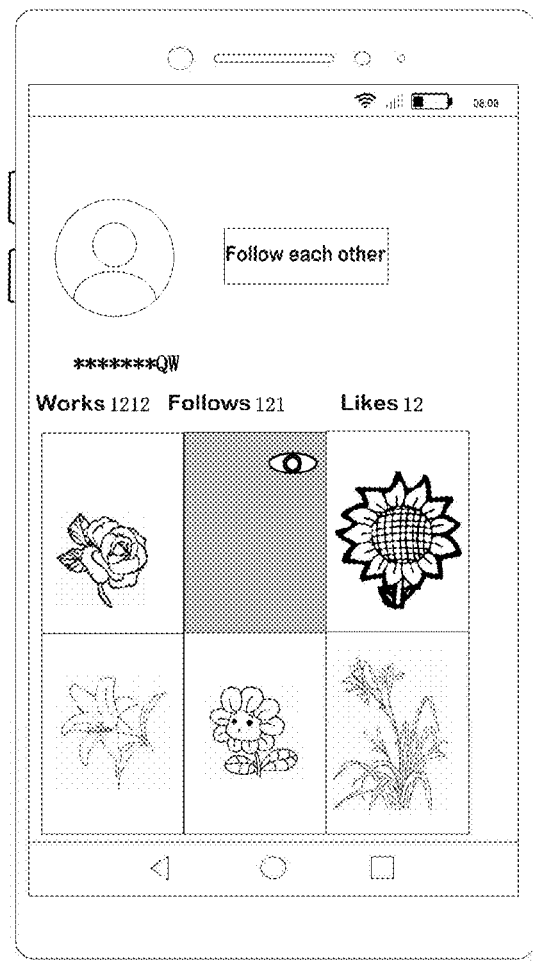
FIG. 13 is a schematic diagram of a user personal homepage provided by an embodiment of the present disclosure.

In addition, in response to that the target video is displayed on a user personal homepage, a mask layer may also be generated for a cover of the target video to identify that the target video belongs to the video that only supports playback once. As shown in FIG. 13, it is a schematic diagram of a user personal homepage provided by an embodiment of the present disclosure, wherein a mask layer and an eye icon are displayed on a cover of a target video. It should be noted that the user personal homepage in FIG. 13 may be a homepage of a current user, or a homepage of another user that the current user is visiting.

Figure 14:
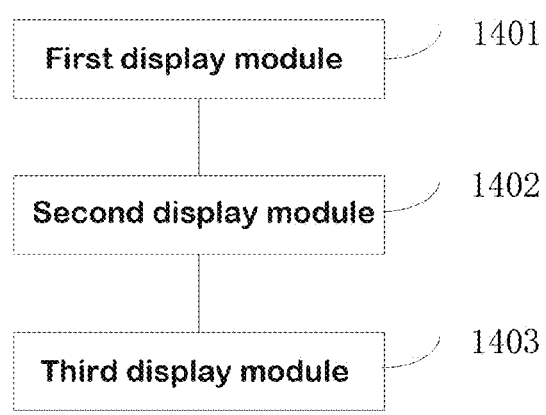
FIG. 14 is a schematic structural diagram of a video processing apparatus provided by an embodiment of the present disclosure.

Based on the foregoing method embodiments, the present disclosure further provides a video processing apparatus as shown in FIG. 14, which is a schematic structural diagram of a video processing apparatus provided by an embodiment of the present disclosure, the apparatus comprising:
- a first display module 1401 configured to, in response to that a target video is being played back, display a playback progress bar in a preset countdown mode, wherein the playback progress bar does not support pausing of a playback function;
- a second display module 1402 configured to, in response to detecting that playback of a last frame of the target video has ended, stop the playback of the target video, and display a mask layer on a video picture of the last frame of the target video; and
- a third display module 1403 configured to display preset prompt information on the mask layer, wherein the preset prompt information is used for prompting that the target video only supports playback once.

In an alternative implementation, the apparatus further comprises:
- a fourth display module configured to, in response to a preset triggering operation for the target video, display a shooting prompt window corresponding to the target video, wherein the shooting prompt window is thereon provided with a preset shooting entry; and
- a fifth display module configured to, in response to a triggering operation for the preset shooting entry, display a shooting page with a shooting mode corresponding to the target video.

In an alternative implementation, a playback page for the target video is thereon provided with a preset point; and
the fourth display module is specifically configured to:
in response to a triggering operation for the preset point on the playback page for the target video or a non-button area on the mask layer, display the shooting prompt window corresponding to the target video.

In an alternative implementation, the shooting page is thereon provided with a shooting mode control corresponding to the target video; and the apparatus further comprises:
- a first switching module configured to, in response to a triggering operation for the shooting mode control on the shooting page, switch an enabled/disabled state of the shooting mode control, and display prompt information corresponding to the switched enabled/disabled state.

In an alternative implementation, the apparatus further comprises:
- a second switching module configured to, in response to a triggering operation of switching the enabled/disabled state of the shooting mode control to an enabled state, switch a display icon of a shooting button on the shooting page to an icon corresponding to the shooting mode control.

In an alternative implementation, the apparatus further comprises:
- a first presentation module configured to, in response to a shooting end operation triggered on the shooting page, display a shooting result video on a video editing page, wherein the video editing page is thereon provided with an editing control corresponding to the shooting mode control; and
- a processing module configured to, in response to a triggering operation of switching an enabled/disabled state of the editing control to an enabled state, process the shooting result video into a video type to which the target video belongs.

In an alternative implementation, the preset countdown mode comprises a flame burning countdown mode.

In an alternative implementation, the apparatus further comprises:
- a sixth display module configured to, in response to detecting that the playback of the last frame of the target video has ended, display a preset shooting-with-same-style entry on the playback page for the target video;
- a seventh display module configured to, in response to a triggering operation for the preset shooting-with-same-style entry, display a shooting page based on a music resource and/or a prop resource carried by the target video, wherein the shooting page has the shooting mode corresponding to the target video.

In an alternative implementation, the apparatus further comprises:
- a seventh display module configured to, in response to detecting that the playback of the last frame of the target video has ended, display a preset quick comment box on the playback page for the target video, wherein the preset quick comment box is used for inputting comment information for the target video.

In an alternative implementation, the apparatus further comprises:
- a second presentation module configured to, in response to a sharing operation for the target video, generate a mask layer for a cover of the target video, and present the cover of the target video with the mask layer on a sharing page.

In an alternative implementation, the apparatus further comprises:
- a generation module configured to, in response to detecting that the target video is displayed on a user personal homepage, generate a mask layer for a cover of the target video.

In an alternative implementation, the first display module is specifically configured to:
in response to a triggering operation of switching a first type video to the target video, play back the target video, and switch a first type playback progress bar corresponding to the first type video to the playback progress bar in the preset countdown mode, wherein the first type playback progress bar supports the adjustment of the playback progress function, and the first type video supports playback many times.

In the video processing apparatus provided by the embodiment of the present disclosure, in response to that a target video is being played back, a playback progress bar in a preset countdown mode that does not support adjustment of a playback progress function is displayed, in response to detecting that playback of a last frame of the target video has ended, the playback of the target video is stopped, and on the basis of the last frame of the target video, preset prompt information used for prompting that the target video only supports playback once is displayed. Hence, the embodiment of the present disclosure provides a video interaction mode that only supports playback once, thereby enriching the video-based entertainment modes of users, and improving the user experience.

In addition, in the video processing apparatus provided by the embodiment of the present disclosure, an immersive interactive space can also be provided for the user, where the user is guided to enter the shooting page to shoot the video for only playback once, and the video editing page with the "flicker" type editing function is provided for the user, thereby further improving the user experience.

In addition to the above method and apparatus, an embodiment of the present disclosure further provides a computer-readable storage medium having therein stored instructions which, when run on a terminal device, cause the terminal device to implement the video processing method according to the embodiments of the present disclosure.

An embodiment of the present disclosure further provides a computer program product comprising a computer program/instructions which, when executed by a processor, implement the video processing method according to the embodiments of the present disclosure.

Figure 15:
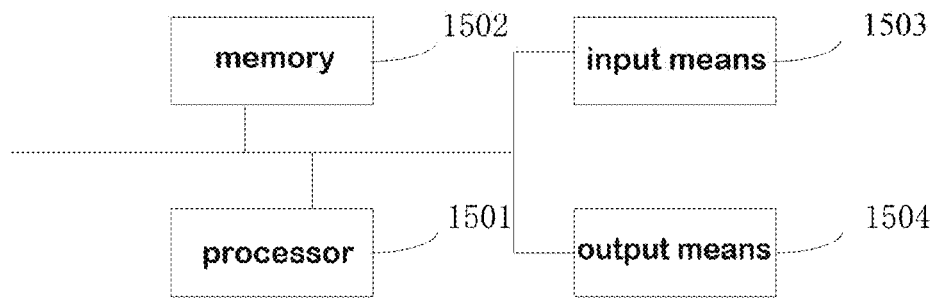
FIG. 15 is a schematic structural diagram of a video processing device provided by an embodiment of the present disclosure.

In addition, an embodiment of the present disclosure further provides a video processing device as shown in FIG. 15, comprising:

a processor 1501, a memory 1502, an input means 1503, and an output means 1504. The number of the processors 1501 in the video processing device may be one or more, wherein one processor is taken as an example in FIG. 15. In some embodiments of the present disclosure, the processor 1501, the memory 1502, the input means 1503, and the output means 1504 may be connected by a bus or other means, wherein the connection by the bus is taken as an example in FIG. 15.

The memory 1502 may be configured to store a software program and modules, and the processor 1501 executes various functional applications and data processing of the video processing device by running the software program and modules stored in the memory 1502. The memory 1502 may mainly include a storage program area and a storage data area, wherein the storage program area may store an operating system, an application required for at least one function, and the like. Furthermore, the memory 1502 may include a high speed random access memory, and may also include a non-volatile memory, for example, at least one magnetic disk storage device, flash memory device, or other volatile solid-state storage devices. The input means 1503 may be configured to receive inputted number or character information, and generate a signal input related to user settings and functional control of the video processing device.

Specifically, in this embodiment, the processor 1501 can load executable file(s) corresponding to process(es) of one or more applications into the memory 1502 according to the following instructions, and the applications stored in the memory 1502 are run by the processor 1501, thereby realizing various functions of the above video processing device.

It should be noted that, herein, relational terms such as "first" and "second", are only used for distinguishing one entity or operation from another entity or operation without necessarily requiring or implying any actual such relation or order between these entities or operations. Moreover, terms "comprise", "include", or any other variation thereof, are intended to cover a non-exclusive inclusion, such that a process, method, article, or device comprising a list of elements not only includes those elements, but also includes another element not expressly listed or an element inherent to such process, method, article, or device. Without further limitation, an element defined by a statement "comprising one . . . " does not exclude the presence of another identical element in a process, method, article, or device that comprises the element.

The above content is only the specific implementations of the present disclosure, which enable those skilled in the art to understand or the implement present disclosure. Various modifications to these embodiments will be readily apparent to those skilled in the art, and the general principles defined herein may be implemented in other embodiments without departing from the spirit or scope of the present disclosure. Therefore, the present disclosure will not be limited to these embodiments described herein, but accord with the widest scope consistent with the principles and novel features disclosed herein.

What is claimed is:

1. A video processing method, comprising:
   in response to that a target video is being played back, displaying a playback progress bar in a preset countdown mode to display playback progress of the target video, wherein the playback progress bar does not support adjustment of a playback progress function during playback of the target video, wherein the playback progress function presents a difference between the target video and other video, the target video supporting playback only once, wherein the playback progress bar provides an effect that the target video will be destroyed after the playback of the target video ends; and
   in response to detecting that playback of a last frame of the target video has ended, then stopping the playback of the target video, displaying a mask layer on a video picture of the last frame of the target video, and displaying preset prompt information on the mask layer, wherein the preset prompt information is used for prompting that the target video supports playback only once.

2. The method according to claim 1, further comprising:
   in response to a preset triggering operation for the target video, displaying a shooting prompt window corresponding to the target video, wherein the shooting prompt window is thereon provided with a preset shooting entry; and
   in response to a triggering operation for the preset shooting entry, displaying a shooting page with a shooting mode corresponding to the target video.

3. The method according to claim 2, wherein a playback page for the target video is thereon provided with a preset point; and
   the displaying, in response to a preset triggering operation for the target video, a shooting prompt window corresponding to the target video comprises:
   in response to a triggering operation on the preset point on the playback page for at least one of the target video or a non-button area on the mask layer, displaying the shooting prompt window corresponding to the target video.

4. The method according to claim 2, wherein the shooting page is thereon provided with a shooting mode control corresponding to the target video; and after the displaying, in response to a triggering operation for the preset shooting entry, a shooting page with a shooting mode corresponding to the target video, the method further comprises:
  in response to a triggering operation on the shooting mode control on the shooting page, switching an enabled/disabled state of the shooting mode control, and displaying prompt information corresponding to the switched enabled/disabled state.

5. The method according to claim 4, further comprising:
  in response to a triggering operation of switching the enabled/disabled state of the shooting mode control to an enabled state, switching a display icon of a shooting button on the shooting page to an icon corresponding to the shooting mode control.

6. The method according to claim 4, further comprising:
  in response to a shooting end operation triggered on the shooting page, presenting a shooting result video on a video editing page, wherein the video editing page is thereon provided with an editing control corresponding to the shooting mode control; and
  in response to a triggering operation of switching an enabled/disabled state of the editing control to an enabled state, processing the shooting result video into a video type to which the target video belongs.

7. The method according to claim 1, wherein the preset countdown mode comprises a flame burning countdown mode.

8. The method according to claim 1, further comprising:
  in response to detecting that the playback of the last frame of the target video has ended, then displaying a preset shooting-with-same-style entry on a playback page for the target video; and
  in response to a triggering operation for the preset shooting-with-same-style entry, displaying a shooting page based on at least one of a music resource or prop resource carried by the target video, wherein the shooting page has a shooting mode corresponding to the target video.

9. The method according to claim 1, further comprising:
  in response to detecting that the playback of the last frame of the target video has ended, then displaying a preset quick comment box on a playback page for the target video, wherein the preset quick comment box is used for inputting comment information for the target video.

10. The method according to claim 1, further comprising:
  in response to a sharing operation for the target video, generating a mask layer for a cover of the target video, and presenting the cover of the target video with the mask layer on a sharing page.

11. The method according to claim 1, further comprising:
  in response to detecting that the target video is displayed on a user personal homepage, generating a mask layer for a cover of the target video.

12. The method according to claim 1, wherein the displaying, in response to that a target video is being played back, a playback progress bar in a preset countdown mode comprises:
  in response to a triggering operation of switching a first type video to the target video, playing back the target video, and switching a first type playback progress bar corresponding to the first type video to the playback progress bar in the preset countdown mode, wherein the first type playback progress bar supports adjustment of the playback progress function, and the first type video supports playback many times.

13. A non-transitory computer-readable storage medium having therein stored instructions which, when run on a terminal device, cause the terminal device to implement a method, the method comprising:
  in response to that a target video is being played back, displaying a playback progress bar in a preset countdown mode to display playback progress of the target video, wherein the playback progress bar does not support adjustment of a playback progress function during playback of the target video, wherein the playback progress function presents a difference between the target video and other video, the target video supporting playback only once, wherein the playback progress bar provides an effect that the target video will be destroyed after the playback of the target video ends; and
  in response to detecting that playback of a last frame of the target video has ended, then stopping the playback of the target video, displaying a mask layer on a video picture of the last frame of the target video, and displaying preset prompt information on the mask layer, wherein the preset prompt information is used for prompting that the target video supports playback only once.

14. The non-transitory computer-readable storage medium according to claim 13, wherein the method further comprises:
  in response to a preset triggering operation for the target video, displaying a shooting prompt window corresponding to the target video, wherein the shooting prompt window is thereon provided with a preset shooting entry; and
  in response to a triggering operation for the preset shooting entry, displaying a shooting page with a shooting mode corresponding to the target video.

15. The non-transitory computer-readable storage medium according to claim 14, wherein a playback page for the target video is thereon provided with a preset point; and
  the displaying, in response to a preset triggering operation for the target video, a shooting prompt window corresponding to the target video comprises:
    in response to a triggering operation on the preset point on the playback page for at least one of the target video or a non-button area on the mask layer, displaying the shooting prompt window corresponding to the target video.

16. The non-transitory computer-readable storage medium according to claim 14, wherein the shooting page is thereon provided with a shooting mode control corresponding to the target video; and
  after the displaying, in response to a triggering operation for the preset shooting entry, a shooting page with a shooting mode corresponding to the target video, the method further comprises:
    in response to a triggering operation on the shooting mode control on the shooting page, switching an enabled/disabled state of the shooting mode control, and displaying prompt information corresponding to the switched enabled/disabled state.

17. A device, comprising: a memory, a processor, and a computer program stored on the memory and running on the processor, the processor implementing a method when executing the computer program, the method comprising:
  in response to that a target video is being played back, displaying a playback progress bar in a preset countdown mode to display playback progress of the target video, wherein the playback progress bar does not support adjustment of a playback progress function during playback of the target video, wherein the playback progress function presents a difference between the target video and other video, the target video supporting playback only once, wherein the playback progress bar provides an effect that the target video will be destroyed after the playback of the target video ends; and in response to detecting that playback of a last frame of the target video has ended, then stopping the playback of the target video, displaying a mask layer on a video picture of the last frame of the target video, and displaying preset prompt information on the mask layer, wherein the preset prompt information is used for prompting that the target video supports playback only once.

18. The device according to claim 17, wherein the method further comprises:

in response to a preset triggering operation for the target video, displaying a shooting prompt window corresponding to the target video, wherein the shooting prompt window is thereon provided with a preset shooting entry; and in response to a triggering operation for the preset shooting entry, displaying a shooting page with a shooting mode corresponding to the target video.

19. The device according to claim 18, wherein a playback page for the target video is thereon provided with a preset point; and the displaying, in response to a preset triggering operation for the target video, a shooting prompt window corresponding to the target video comprises:

in response to a triggering operation on the preset point on the playback page for at least one of the target video or a non-button area on the mask layer, displaying the shooting prompt window corresponding to the target video.

20. The device according to claim 18, wherein the shooting page is thereon provided with a shooting mode control corresponding to the target video; and after the displaying, in response to a triggering operation for the preset shooting entry, a shooting page with a shooting mode corresponding to the target video, the method further comprises:

in response to a triggering operation on the shooting mode control on the shooting page, switching an enabled/disabled state of the shooting mode control, and displaying prompt information corresponding to the switched enabled/disabled state.

* * * * *